Nov. 25, 1969 B. D. BEDFORD ET AL 3,480,797
CONTROLLED SILICON RECTIFIER CIRCUIT HAVING HIGH
NON-CONDUCTING NEGATIVE BIAS RATIO
Filed Oct. 21, 1966
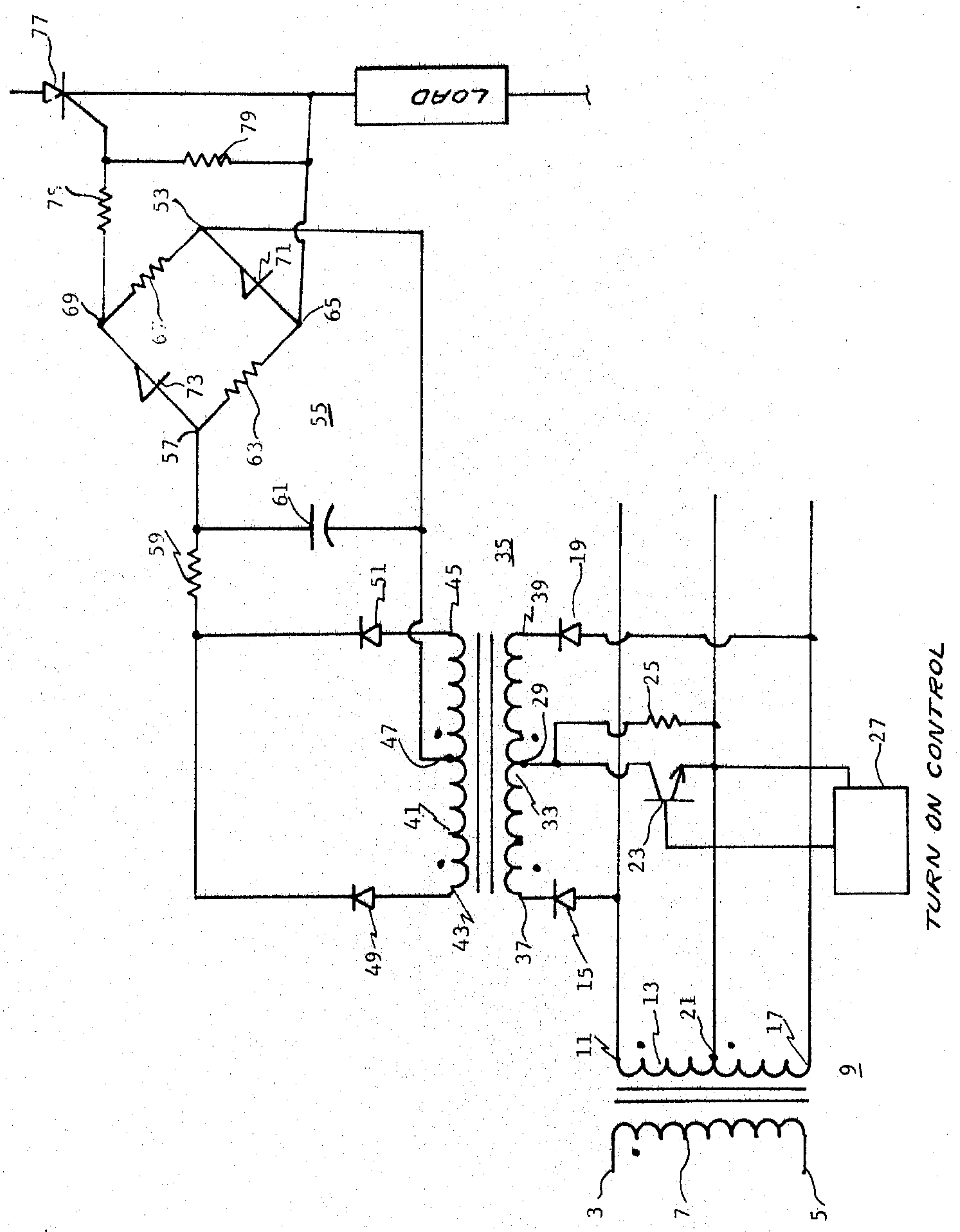
INVENTORS
BURNICE D. BEDFORD
FRED G. TURNBULL
BY
J. T. Comfort United States Patent Office 3,480,797

Patented Nov. 25, 1969

3,480,797
CONTROLLED SILICON RECTIFIER CIRCUIT HAVING HIGH NON-CONDUCTING NEGATIVE BIAS RATIO

Burnice D. Bedford, Scotia, and Fred G. Turnbull, Schenectady, N.Y., assignors to General Electric Company, a corporation of New York Filed Oct. 21, 1966, Ser. No. 588,431

Int. Cl. H03k *17/30*

U.S. Cl. 307—252 7 Claims

ABSTRACT OF THE DISCLOSURE

There is disclosed herein a gating circuit for a silicon controlled rectifier having the conventional anode, cathode, and gate electrode. A high frequency alternating current source for producing a high frequency alternating current signal is provided. A bridge circuit having breakdown diodes connected in two legs of the bridge circuit is connected to the gate electrode of the silicon controlled rectifier. A first transformer has a primary winding connected to the high frequency alternating current source and a center tapped secondary winding. A second transformer has a center tapped primary winding connected to the secondary winding of the first transformer and a center tapped secondary winding connected to the bridge circuit. A transistor and resistor are connected in parallel between the center tap of the secondary winding of the first transformer and the center tap of the primary winding of the second transformer. The transistor may be turned on to apply breakdown voltage to the breakdown diodes in the bridge circuit and apply a gating signal to the gate electrode of the silicon controlled rectifier.

This invention is directed to silicon controlled rectifiers, and more particularly to a new and improved gating circuit for silicon controlled rectifiers.

Tht silicon controlled rectifier has become accepted in many applications. A continuing problem in many applications is the provision of a proper gating signal to the gate of the silicon controlled rectifier to gate the silicon controlled rectifier on. Many gating circuits have been proposed and used. The silicon unijunction transistor is commonly used in gating circuits.

In many applications, such as inverters, it is important that there be a fast rate of initial gate current.

It is therefore an object of this invention to provide a new and improved gating circuit for silicon controlled rectifiers.

Another object of this invention invention is to provide a new and improved gating circuit for silicon controlled rectifiers which provides a fast rate of initial gate current at turn-on.

It is another object of this invention to provide a new and improved gating circuit for silicon controlled rectifiers which provides a substantial negative gate to cathode voltage during the non-conducting interval of the silicon controlled rectifier.

Another object of this invention is to provide a new and improved gating circuit for silicon controlled rectifiers which provides, a gating signal having a precise threshold.

According to this invention, therefore, a gating circuit for a silicon controlled rectifier having the conventional anode, cathode, and gate electrode is provided. A high frequency alternating current source for producing a high frequency alternating current signal is provided. A bridge circuit having breakdown diodes connected in two legs of said bridge circuit is connected to the gate electrode of said silicon controlled rectifier. The high frequency alternating current signals are then selectively applied to the bridge circuit to break down the breakdown diodes in the bridge circuit and apply a gating signal to the gate electrode of said silicon controlled rectifier.

The invention is set forth with particularity in the appended claims. The principles and characteristics of the invention, as well as other objects and advantages are revealed and discussed through the medium of the illustrative embodiments appearing in the specification and drawing which follow.

In the drawing:

The figure shows a gating circuit constructed according to this invention.

Referring now to the drawing, a 10 kc. carrier frequency power supply is connected to terminals 3 and 5 of the primary 7 of transformer 9. Terminal 11 of the secondary 13 of transformer 9 is connected to the anode of diode 15, and terminal 17 of the secondary 13 of transformer 9 is connected to the anode of diode 19. The center tap 21 of the secondary of transformer 9 is connected to tht emitter of NPN transistor 23, and to resistor 25. The base of NPN transistor 23 is connected to a turn-on control 27.

The collector of NPN transistor 23 and resistor 25 are connected to the center tap 29 of the primary 33 of transformer 35, and the cathodes of diode 15 and 29 are connected to terminals 37 and 39, respectively, of the primary 33 of transformer 35. One terminal 43 of the secondary of transformer 35 is connected to the anode of diode 49, and the other termianl 45 is connected to the anode of diode 51. The center tap 47 of secondary 41 is connected to terminal 53 of a bridge circuit 55. The opposite terminal 57 of the bridge circuit 55 is connected through resistor 59 to the cathode of diode 49. The cathode of diode 51 is also connected to resistor 59. A capacitor 61 is connected between terminal 53 and 57 of bridge circuit 55. Resistor 59 and capacitor 61 connected as described form a filter circuit.

Resistor 63 is connected between terminal 57 and terminal 65, resistor 67 is connected between terminals 53 and 69, breakdown diode 71 is connected between terminals 53 and 65, and breakdown diode 73 is connected between terminals 57 and 69. The anode of breakdown diode 73 is connected to terminal 57, and the cathode to terminal 69. The anode of breakdown diode 71 is connected to terminal 65, and the cathode to terminal 53. Breakdown diodes 71 and 73, and resistors 63 and 67 connected in the manner described form a bridge circuit 55. Breakdown diodes 71 and 73 are four-layer diodes which are sometimes called Shockley diodes and do not pass current until the voltage reaches a predetermined value.

Terminal 69 of bridge 55 is connected through resistor 75 to the gate electrode of silicon controlled rectifier 77, and terminal 65 of bridge circuit 55 is connected through resistor 79 to the gate electrode of silicon controlled rectifier 77. Terminal 65 of bridge circuit 55 is also connected to the cathode of silicon controlled rectifier 77. The anode and cathode of silicon controlled rectifier 77 are connected into a load circuit.

The carrier frequency power supply applies a 10 KC single phase alternating voltage to terminals 3 and 5 of the primary 7 of transformer 9. When transistor 23 is turned on by turn-on circuit 27, the carrier frequency voltage is applied through diodes 15 and 19 to the primary 33 of transformer 35. The carrier frequency voltage is transformed by transformer 35 and then rectified by diodes 49 and 51. The filter composed of resistor 59 and capacitor 61 allows some voltage to be stored in capacitor 61. When the voltage on capacitor 61 increases to a value equal to the sum of the forward breakover voltage of breakdown diodes 71 and 73, these breakdown diodes 71 and 73 break down; and capacitor 61 will discharge into resistor 75 and the gate electrode of silicon controlled rectifier 77 to fire silicon controlled rectifier 77.

When NPN transistor 23 is turned off, resistor 25 and the reflected load from transformer 35 provide a voltage divider so that the magnitude of the voltage on transformer 35 is less than when transistor 23 is conducting. Therefore, the reduced D-C voltage on capacitor 61 is not large enough to exceed the breakover voltage of breakdown diodes 71 and 73. The four resistors 63, 67, 75, and 79 form a voltage divider so that the voltage on the gate electrode to cathode of the silicon controlled rectifier is reverse-biased by the voltage drop across resistor 79. The action of the bridge connection of the breakdown diodes 71 and 73 and resistors 63 and 67 provides the reversal of the gate to cathode silicon controlled rectifier voltage depending on the magnitude of the D-C voltage level capacitor 61.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A gating circuit for a controlled silicon rectifier supplying current to a load connected between the anode and cathode of said rectifier including an alternating current source for producing a signal, a bridge circuit, a pair of breakdown diodes arranged one each in opposite legs of said bridge circuit, means for selectively applying said signal to said bridge circuit to break down said diodes for applying a gating signal to the gate electrode of said rectifier, and means under control of said diodes for reverse biasing said gate electrode when the amplitude of said signal is insufficient to break down said diodes.

2. The invention according to claim 3 wherein said selective means includes a transformer having a center-tapped primary connected to said alternating current source and a center-tapped secondary winding connected to said bridge, and means connected to the center tap of the said primary for selectively reducing the said transformer voltage.

3. The invention according to claim 2 with the further improvement of a capacitor and a resistor, said selective means applying alternating current to said filter to charge said capacitor to the breakdown voltage of said diodes for producing a gating signal to said gate electrode.

4. The invention according to claim 3 wherein means are provided connecting said bridge circuit to the cathode of said controlled silicon rectifier to reverse bias the gate of said rectifier when said signal is removed from said bridge circuit.

5. The invention according to claim 1 including a transformer having a primary winding connected to said alternating current source and a center-tapped secondary winding, said selective means having a second transformer with a center-tapped primary winding connected across the secondary of the first said transformer the center-tap of which is connected to said bridge circuit, said selective means also including a transistor and resistor in parallel connected across the aforesaid center-taps, and further selective means for energizing said transistor to apply breakdown voltage to said breakdown diodes and for de-energizing said transistor to reduce said breakdown voltage below breakdown limits.

6. The invention of claim 5 wherein the first said rectifier means connect the secondary of said first transformer to the primary of said second transformer, and the second said rectifier means connect the secondary of the second transformer to said bridge circuit.

7. The invention as claimed in claim 6 wherein a filter is provided including a capacitor and a resistor, and means connecting the center-tap of said second transformer to said filter for charging the said capacitor to the breakover voltage of said breakdown diodes to apply a gating signal of said controlled silicon rectifier when said transistor is energized.

References Cited

UNITED STATES PATENTS

| | | | |
|---|---|---|---|
| 3,077,544 | 2/1963 | Connelly | 307—257 |
| 3,185,665 | 5/1965 | Wright | 307—252 |
| 3,299,297 | 1/1967 | Motto | 307—252 |

DONALD D. FORRER, Primary Examiner

J. D. FREW, Assistant Examiner

U.S. Cl. X.R.

307—257, 287, 305, 321